United States Patent [19]

Katayama et al.

[11] Patent Number: 5,102,361

[45] Date of Patent: Apr. 7, 1992

[54] METHOD FOR THE MANUFACTURE OF ACTIVE MATRIX DISPLAY APPARATUSES

[75] Inventors: Mikio Katayama, Ikoma; Hiroaki Kato, Nara; Takayoshi Nagayasu, Nara; Akihiko Imaya, Nara; Hidenori Negoto, Ikoma; Yuzuru Kanemori, Tenri; Kiyoshi Nakazawa, Fujiidera, all of Japan

[73] Assignee: Sharp Kabushiki Kaisha, Osaka, Japan

[21] Appl. No.: 467,648

[22] Filed: Jan. 19, 1990

[30] Foreign Application Priority Data

Jan. 23, 1989 [JP] Japan ................................ 1-13688
Mar. 28, 1989 [JP] Japan ................................ 1-77827
May 10, 1989 [JP] Japan ............................... 1-116695
Jun. 15, 1989 [JP] Japan ............................... 1-153133

[51] Int. Cl.$^5$ ............................................. H01J 9/42
[52] U.S. Cl. ................................. 445/4; 445/24; 437/8; 437/923
[58] Field of Search ................ 445/3, 4, 24, 25; 437/8, 923

[56] References Cited

FOREIGN PATENT DOCUMENTS 0200138 12/1986 European Pat. Off. .
0372898 6/1990 European Pat. Off. .
59-101693 6/1984 Japan .
61-56382 3/1986 Japan .
61-153619 7/1986 Japan .
232144 10/1987 Japan .
250627 10/1988 Japan .

OTHER PUBLICATIONS

Patent Abstracts of Japan (Jun. 23, 1987) 11(195):E-518.
Patent Abstracts of Japan (Apr. 2, 1988) 12(101):E-595.

Primary Examiner—Kenneth J. Ramsey
Attorney, Agent, or Firm—Morrison & Foerster

[57] ABSTRACT

A method for manufacturing an active matrix display apparatus comprising: forming picture element electrodes disposed in a matrix at the inner surface of either one of a pair of substrates, switching elements electrically connected to the picture element electrodes respectively, spare switching elements disposed close to the picture element electrodes in a non-conductive state respectively, and connections, each including an extension end of each of the spare switching elements and a metal piece electrically connected to one end of each of the picture element electrodes, the extension end and metal piece being disposed opposite to each other in a non-conductive state; applying a drive signal to a display medium via the picture element electrodes and opposite electrodes thereby detecting a defect in the switching element; and irradiating energy onto the connection between the picture element electrode connected to the switching element, the defect of which has been detected, and the spare switching element, thereby electrically connecting the picture element electrode with the spare switching element, whereby the apparatus can be provided with a high yield.

17 Claims, 13 Drawing Sheets

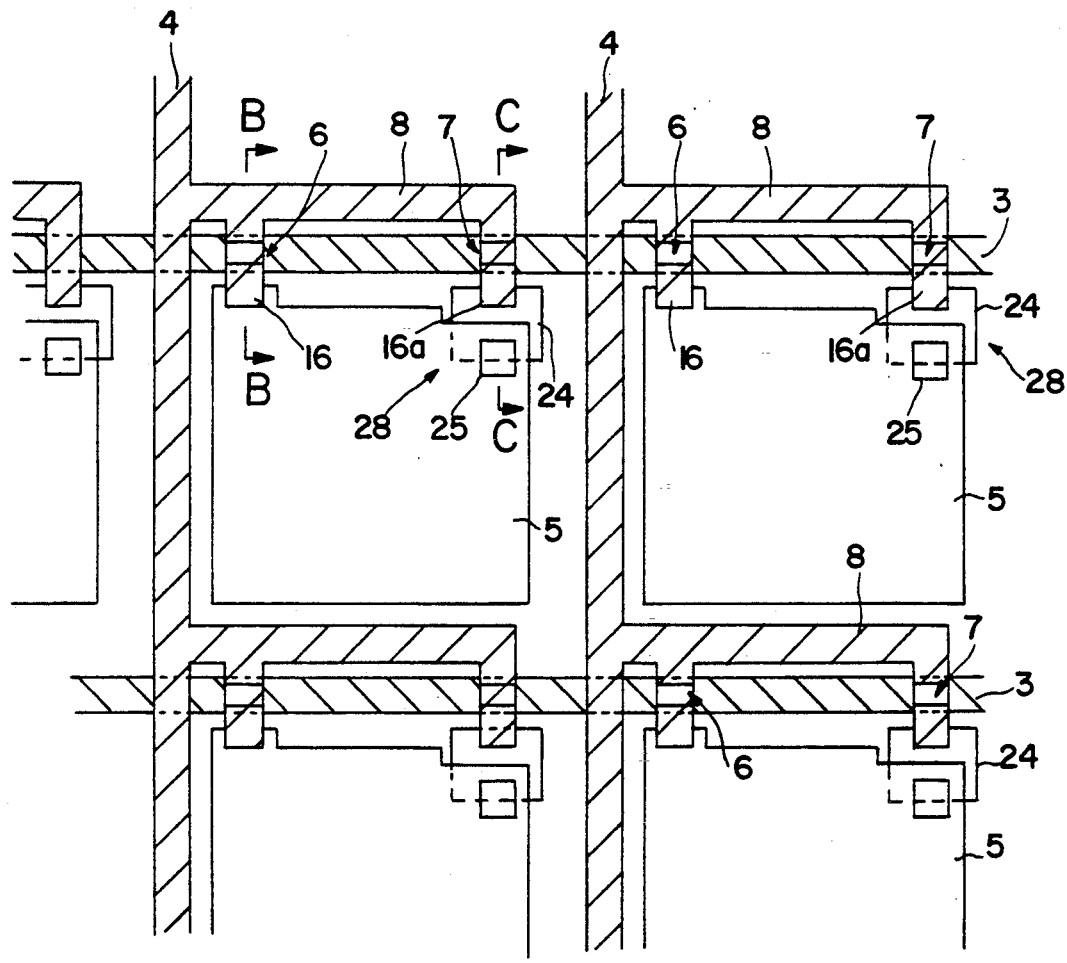
FIG. IA

METHOD FOR THE MANUFACTURE OF ACTIVE MATRIX DISPLAY APPARATUSES

BACKGROUND OF THE INVENTION

1. Field of the Invention

The present invention relates to a method for the manufacture of display apparatuses for performing displays, by applying a drive signal to the displaying picture element electrodes by means of switching elements, and more particularly to a manufacturing method for display apparatuses of an active drive mode which disposes the picture element electrodes in a matrix so as to perform high density displays.

2. Description of the Prior Art

A liquid crystal display apparatus, an electro-luminance display apparatus and a plasma display apparatus have hitherto been selected to display picture elements disposed in a matrix form to display a pattern on a picture plane. A method for selecting display picture elements includes an active matrix driving method which disposes individually independent picture element electrodes and connects the switching element to the respective picture element electrodes for display drive. This method enables displays in high contrast and is put in practical use for liquid crystal television, word processors, terminal display units for computers, or the like. The switching element for selectively driving the picture element electrodes is either a thin film transistor (TFT) element, a metal-insulator-metal (MIM) element, a MOS transistor element, a diode, a varistor or the like. Voltage applied between the picture element electrodes and an electrode apposite thereto is switched to optically modulate a display medium, such as liquid crystal, EL light emission layer or plasma luminosity, the optical modulation being visually recognized as the display pattern.

When the switching elements are connected to the picture element electrodes for carrying out the high density display, it is required to dispose a great many picture element electrodes and switching elements. The switching element, however, may be a malfunctioning element at the time when it is packaged on a substrate, and the picture element electrode connected to such a poor element leads to a picture element defect that does not contribute to the display. The generation of such a picture element defect largely lowers the manufacturing yield of the apparatuses, which leads to a serious problem in the manufacture. Therefore, techniques of later correcting the generated picture element defect have been examined.

A technique for restoring the picture element defect has been disclosed in, for example, Japanese Laid-Open Patent Publication No. 61-153619, in which a plurality of switching elements are provided per one picture element electrode, and only one of these switching elements is connected to the picture element electrode. The switching element connected to the picture element electrode, when it is poor, is cut off from the picture element electrode by a laser trimmer, an ultrasonic cutter or the like, and another switching element is connected to the picture element electrode. In this case, the switching element and picture element electrode are connected therebetween by bonding a minute conductor with a dispenser or the like, or by coating Au, Al or the like at a predetermined location on the substrate. Furthermore, Japanese Laid-Open Patent Publications No. 61-56382 and No. 59-101693 disclose the technique for irradiating the laser light to melt metal so as to electrically connect between the metal layers.

The aforesaid defect correction is carried out in the state of an active matrix substrate prior to assembly of the display apparatus. However, it is very difficult to detect the picture element defect in the process of manufacturing the active matrix substrate. Especially, for a large-sized panel of picture elements of one hundred thousand to five hundred thousands or more, measurement equipment of extremely high accuracy must be used to detect the electrical characteristics of all the picture element electrodes so as to find a poor switching element. As a result, the detection process becomes complicated, the mass productivity is impeded, and the display apparatus has a high production cost. Accordingly, the fact is that the aforesaid restoring techniques cannot be used for the large-sized display panel with a large number of picture elements. Therefore, it is impossible to use the laser light for restoring the defect in picture elements as above-mentioned, which makes it impossible to improve the manufacturing yield.

SUMMARY OF THE INVENTION

The method for manufacturing an active matrix display apparatus of this invention, which overcomes the above-discussed and numerous other disadvantages and deficiencies of the prior art, comprises the steps of: forming picture element electrodes disposed in a matrix at the inner surface of either one of said pair of substrates, switching elements electrically connected to said picture element electrodes respectively, spare switching elements disposed close to said picture element electrodes in a non-conductive state respectively, and connections, each including an extension end of each of said spare switching elements and a metal piece electrically connected to one end of each of said picture element electrodes. Said extension end and metal piece being disposed opposite to each other in a non-conductive state; forming opposite electrodes on the other of said pair of substrates; charging said display medium between said pair of substrates; applying a drive signal to said display medium via said picture element electrodes and opposite electrodes, thereby detecting a defect in said switching element; and irradiating energy onto said connection between said picture element electrode connected to said switching element, the defect of which has been detected, and said spare switching element, thereby electrically connecting said picture element electrode with said spare switching element.

Alternatively, the method for manufacturing an active matrix display apparatus of this invention comprises the steps of: forming picture element electrodes disposed in a matrix at the inner surface of either one of said pair of substrates and having cutouts respectively, switching elements electrically connected to said picture element electrodes in the vicinity of said cutouts respectively, spare switching elements disposed close to said picture element electrodes in a non-conductive state respectively, and connections, each including an extension end of each of said spare switching elements and a metal piece electrically connected to one end of each of said picture element electrodes. Said extension end and metal piece being disposed opposite to each other so as to sandwich at least an insulating film therebetween; forming opposite electrodes on the other of said pair of substrates; charging said display medium between said pair of substrates; applying a drive signal to said display medium via said picture element electrodes and opposite electrodes to thereby detect a defect in said switching element; irradiating energy onto said connection between said picture element electrode connected to said switching element, the defect of which has been detected, and said spare switching element, thereby electrically connecting said picture element electrode with said spare switching element; and irradiating energy to electrically disconnect between said switching element, the defect of which has been detected, and said picture element electrode connected thereto at said cutout thereof.

In a preferred embodiment, at each of said connections, a joint metal layer is disposed below said insulating film on which the extension end of said switching element and said metal piece are disposed to face each other. A through hole is formed in said insulating film positioned between said extension end of said switching element or said metal piece and said joint metal layer.

In a preferred embodiment, at each of said connections, the extension end of said switching element and metal piece are disposed so as to sandwich an insulating film therebetween.

Alternatively, the method for manufacturing an active matrix display apparatus of this invention comprises the steps of: forming picture element electrodes disposed in a matrix on the inner surface of either one of said pair of substrates, switching elements and spare switching elements electrically connected to said picture element electrodes respectively, signal lines connected to said switching elements respectively, and connections each including the extension end of a signal input terminal at each of said spare switching elements and a branch wiring branched from each of said signal lines, said extension end and branch wiring being opposite to each other in a non-conductive state; forming opposite electrodes on the other of said pair of substrates; charging said display medium between said pair of substrates; applying drive voltage to said display medium through said respective picture element electrodes and opposite electrodes, thereby detecting a picture element defect; and irradiating energy onto said connection at which the extension end of said signal input terminal of said spare switching element connected to said picture element electrode, the defect of which has been detected, is opposite to said branch wiring, thereby electrically connecting said spare switching element with said signal line by means of said connection.

In a preferred embodiment, this method further includes a step of electrically disconnecting by means of an energy irradiation either one of portions between said switching element and said signal line and between said switching element and said picture element electrode.

In a preferred embodiment, at each of said connections, a joint metal layer is disposed below said insulating film on which the extension end of said signal input terminal and said branch wiring are disposed to face each other. A through hole is formed in said insulating film positioned between either said extension end of said signal input terminal or said branch wiring and said joint metal layer.

In a preferred embodiment, at each of said connections, the extension end of said signal input terminal and said branch wiring are disposed to sandwich an insulating film therebetween.

Alternatively, the method for manufacturing an active matrix display apparatus of this invention comprises the steps of: forming picture element electrodes disposed in a matrix on the inner surface of either one of said pair of substrates, switching elements and spare switching elements electrically connected to said picture element electrodes respectively, signal lines connected to said switching elements respectively, and connections each including an extension end of a signal input terminal at each of said spare switching elements and each of said signal lines, said extension end and signal line being disposed opposite to each other in a non-conductive state respectively; forming opposite electrodes on the other of said pair of substrates; charging said display medium between said pair of substrates; applying drive voltage to said display medium through said picture element electrodes and opposite electrodes, thereby detecting a picture element defect; irradiating energy to said connection where said extension end of said signal input terminal at said spare switching element connected to said picture element electrode, the defect of which has been detected, is opposite to said signal line, thereby electrically connecting said spare switching element with signal line by means of said connection; and cutting off by an energy irradiation either one of portions between said switching element and said signal line and between said switching element and said picture element electrode In a preferred embodiment, at each of said connections, a joint metal layer is disposed below said insulating film on which said extension end of said signal input terminal and said signal line are disposed to face each other. A through hole is formed at said insulating film between said extension end of said signal input terminal or said signal line and said joint metal layer In a preferred embodiment, at each of said connections, said extension end of said signal input terminal and said signal line are disposed so as to sandwich an insulating film therebetween.

Thus, the invention described herein makes possible the objective of providing a method for manufacturing active matrix display apparatuses at a high yield.

BRIEF DESCRIPTION OF THE DRAWINGS

This invention may be better understood and its numerous objects and advantages will become apparent to those skilled in the art by reference to the accompanying drawings as follows:

FIG. 1A is a plan view showing an active matrix substrate used for an active matrix display apparatus that is manufactured by a manufacturing method of this invention.

DESCRIPTION OF THE PREFERRED EMBODIMENTS

In the following descriptions of seven examples of the preferred embodiments certain common components carry the same reference numbers:

Thin film transistors TFT 6 are the normal switching elements of picture element electrodes 5.

Thin film transistors TFT 7 are the spare switching elements for picture element electrodes 5.

Source bus wirings 4 supply data signals to TFT 6 and spare TFT 7 and represent signal lines.

EXAMPLE 1

Figure 1B:
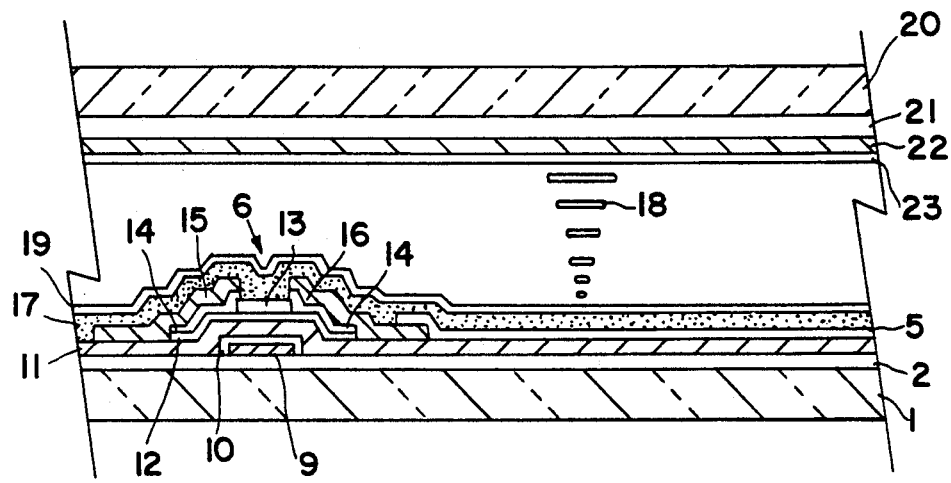
FIGS. 1B and 1C are sectional views showing the active matrix display apparatus with the active matrix substrate of FIG. 1A, taken on lines B—B and C—C of FIG. 1A, respectively.
Figure 1C:
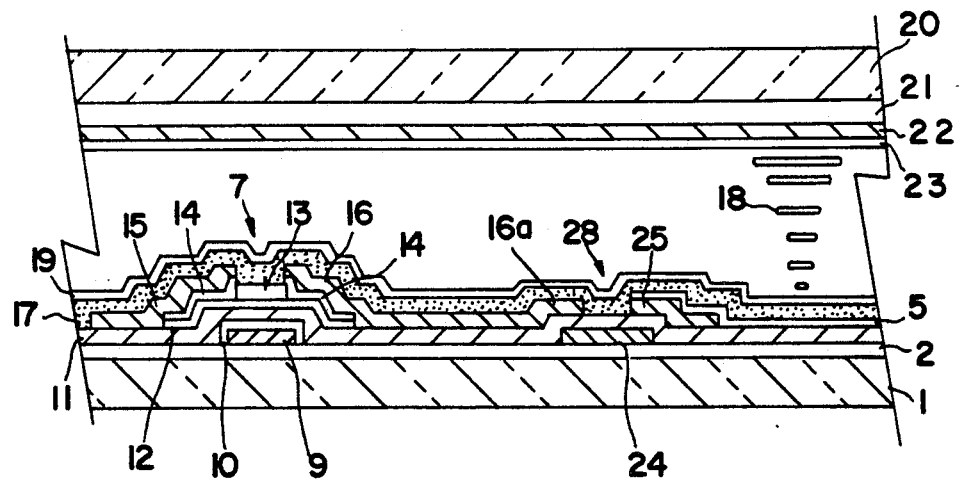

FIG. 1A is a plan view of an active matrix substrate used for an active matrix display apparatus manufactured by a manufacturing method of the invention. The display apparatus is a liquid crystal display apparatus of a transmission type. This invention is, of course, applicable to a liquid crystal display apparatus of the reflection type. FIG. 1A is a plan view of active matrix substrates used for an active matrix display apparatus of the invention, which is a liquid crystal display apparatus of transmission type. This invention is, of course, applicable to a liquid crystal display apparatus of the reflection type. FIGS. 1B and 1C are sectional views of the active matrix display apparatus in FIG. 1A, taken on the lines B—B and C—C therein, in which a base coating film 2 of $Ta_2O_5$, $Al_2O_5$, SiNx or the like with 3000 Å to 9000 Å in thickness is formed on a glass substrate 1. The base coating film 2 is not usually provided. On the base coating film 2 are disposed in a lattice-like shape, gate bus wirings 3 for supplying a scanning signal and source bus wirings 4 for supplying a data signal. The gate bus wirings 3 are generally made of a single layer or multi-layers of metal, such as Ta, Al, Ti, Ni or Mo, but the present embodiment uses Ta. The source bus wirings 4 are made of the same metals as the gate bus wirings 3, but the present embodiment uses Ti. At the intersection of the gate bus wirings 3 and the source bus wirings 4 is interposed a base insulating film 11 that is discussed below. At each rectangular area surrounded by the gate bus wirings 3 and source bus wirings 4 is disposed a corresponding picture element electrode 5 that is composed of a transparent conductive film (ITO), resulting in picture elements in a matrix. A thin film transistor TFT 6 is disposed in the vicinity of one corner of each picture element electrode 5, the TFT 6 and picture element electrode 5 being electrically connected by a drain electrode 16. A spare TFT 7 is disposed in the vicinity of another corner of each picture element electrode 5. The spare TFT 7 and picture element electrode 5 being not-conductively opposite each other so as to form a connection 28. The TFTs 6 and spare TFTs 7 are juxtaposed on the gate bus wiring 3 and connected with the source bus wiring 4 by means of a branch wiring 8 respectively.

Next, explanation will be given on sectional construction in the vicinity of TFT 6 by reference to FIG. 1B. On a gate electrode 9 of Ta formed as part of the gate bus wiring 3 is formed a gate insulating film 10 composed of $Ta_2O_5$ obtained by anodic-oxidizing the surface of gate electrode 9. On the gate insulating film 10 are sequentially laminated a base insulating film 11, an intrinsic semiconductor layer 12, a semiconductor protective coat 13 and an n-type semiconductor layer 14. The base insulating film 11 functions also as a gate insulating film and is composed of SiNx (for example, $Si_3N_4$). The intrinsic semiconductor layer 12 is composed of amorphous silicon (a-Si). The semiconductor protective coat 13 is provided in order to protect the upper surface of intrinsic semiconductor layer 12 and is composed of SiNx. The n-type semiconductor layer 14 is provided for obtaining ohmic contact with the source electrode and drain electrode, and composed of a-Si. On the n-type semiconductor layer 14 are formed a source electrode 15 connected to the branch wiring 8 and a drain electrode 16 connected with the picture element electrode 5, the source electrode 15 and drain electrode 16 being composed of Ti, Ni, Al or the like.

The picture element electrode 5 connected with the end of drain electrode 16 is patterned on the base insulating film 11. A proper thickness of base insulating film 11 is about 1500 Å to 6000 Å, but in the present embodiment it is set to be 2000 Å to 3500 Å protective coat 17 of SiNx is formed on substantially the entire surface to cover the TFT 6 and picture element electrode 5, and an orientation layer 19 for regulating orientation of the liquid crystal molecule of a liquid crystal layer 18 is deposited on the protective coat 17, the orientation layer 19 being composed of $SiO_2$, polyimide resins or the like. The thickness of the protective coat 17 is properly 2000 Å to 10000 Å, but in the present embodiment, it is set to be about 5000 Å. In addition, the base insulating film 11 and protective coat 17 may, other than SiNx, use oxide or nitride, such as SiOx, $Ta_2O_5$ or $Al_2O_3$. In addition, the protective coat 17 is not formed on the entire surface of the substrate, but may be a window-like-shaped by cutting out the central portion of picture element electrode 5.

A color filter layer 21, an opposite electrode 22 opposite to the picture element electrode 5, and an orientation layer 23 are superposed on the inner surface of another glass substrate 20 opposite to the glass substrate 1 on which the picture element electrode 5 is formed. Around the color filter layer 21 is provided a black matrix (not shown) as desired.

Between the pair of glass substrates 1 and 20 is charged a twistingly orientating twisted nematic liquid crystal layer 18 as the display medium, so that the liquid crystal molecules are changed in orientation in response to voltage applied between the picture element electrode 5 and the opposite electrode 22, thereby performing optical modulation.

Next, explanation will be given on construction in the spare TFT 7 and the connection 28, which is the same in construction as the aforesaid TFT 6. As shown in FIG. 1C, a joint metal layer 24 is formed in an island-like shape and on the base coat film 2 at a predetermined distance apart from the gate electrode 9, and composed of Ti, Ni, Al or Ta the same as the gate electrode 9, and can be formed in a pattern simultaneously with the formation of the gate electrode 9. On the joint metal layer 24 is deposited the aforesaid base insulating film 11 and an extension end 16a of a drain electrode is formed on the base insulating film 11 under which the spare TFT 7 is disposed. An end of the picture element electrode 5 is laminated together with a metal piece 25 on the base insulating film 11 that is positioned on the joint metal layer 24. Accordingly, the extension end 16a is separate from the picture element electrode 5 to be kept in not-conductive condition. The metal piece 25 is composed of Ti, Ni, Al or Ta. The extension end 16a of drain electrode at the spare TFT 7 and an end of the picture element electrode on the metal piece 25 are completely covered by the protective coat 17. Also, the base insulating film 11 positioned between the joint metal layer 24 and the extension end 16a of drain electrode and metal piece 25 functions as an interlayer insulating member between the vertical metals and is properly to be of about 1000 Å to 7000 Å in thickness. The base insulating film 11 at the present embodiment serves also as the gate insulating film of TFT, thereby being set to be 2000 Å through 3500 Å as above-mentioned. Also, the protective coat 17 serves to electrically connect the extension end 16a of drain electrode and metal piece 25 in a state of being isolated from liquid crystal layers 18 of display medium, and is proper to be a 1500 Å to 15000 Å thick, but the present embodiment uses the TFT protective coat, whereby the protective coat 17 is set to be about 5000 Å in thickness.

Figure 2:
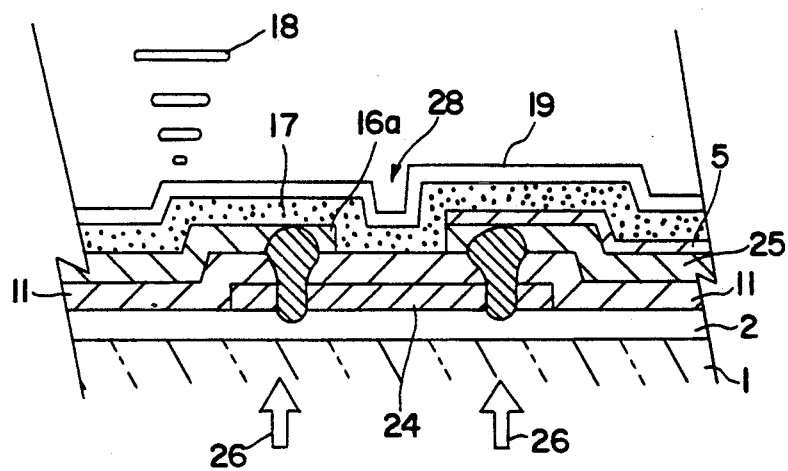
FIG. 2 is a sectional view showing a state that the picture element electrode and an extension end of the drain electrode are electrically connected to each other by the irradiation with laser light.

The entire gate bus wirings 3 at the liquid crystal apparatus of the above-mentioned construction are turned on, drive voltage is applied from the entire source bus wirings 4 to the entire picture element electrodes 5 through TFTs 6, and the display apparatus is driven as a whole. In such a state of display apparatus, the TFT 6, when defective, is easy to visually detect as a defect in the picture element At the detected defective picture element part, as shown by the arrows 26 in FIG. 2, the energy, such as laser light, infrared light, electron beam or the like, is irradiated from the outside thereof to the joint metal layer 24 through the lower glass substrate 1 or the upper glass substrate 20, in which the present invention uses an yttrium-aluminum-garnet (YAG) laser. When the laser light is irradiated, the base insulating film 11 is subjected to dielectric breakdown and the extension end 16a and joint metal layer 24 are melted together, thereby causing a conductive condition. Similarly, the metal piece 25 at the picture element electrode 5 side and the joint metal layer 24, when irradiated therebetween by the laser light, are melted and contact with each other so as to be put in a conductive condition. Thus, the spare TFT 7 and picture element electrode 5 are electrically connected. The protective coat 17 is formed above the joint metal layer 24, extension end 16a and metal piece 25, so that there is no fear that the melted metal mixes into the liquid crystal layer 18 of a display medium. Since the protective coat 17 is a transparent insulator and transmits therethrough the laser light, the laser light is absorbed by the metallic material to be instantaneously heated and melted. Accordingly, the laser light is irradiated to melt and mix the metal materials and the interlayer insulating films sandwiched therebetween are melted and mixed with each other, but the protective coat 17 is not at all brokendown. Also, part of the liquid crystal layer 18 irradiated by the laser light becomes cloudy, but it is confirmed that such a cloudy part is soon restored to the original orientation.

Figure 3:
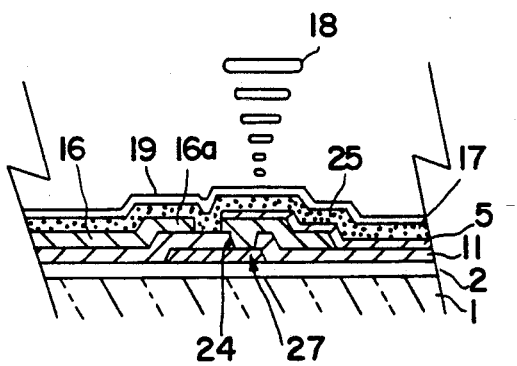
FIGS. 3 and 4, respectively, are sectional views showing other examples of a state that the picture element electrode and the extension end of the drain electrode are positioned in a non-conductive condition.
Figure 4:
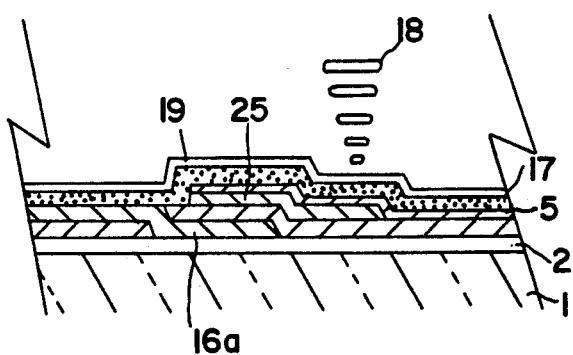

The spare TFT 7 and picture element electrode 5 may, other than the above-mentioned construction, be constructed as shown in FIG. 3 or 4. In FIG. 3, a through hole 27 is previously provided at the base insulating film 11, and connects the joint metal layer 24 with the metal piece 25, whereby the picture element defect caused by malfunction of TFT 6 can be corrected by electrically connecting only the extension end 16a of drain electrode at the spare TFT 7 with the joint metal layer 24 through the optical energy. In the construction in FIG. 4, the joint metal layer 24 is not provided, but the extension end 16a of drain electrode at the spare TFT 7 is disposed just below the metal piece 25 so as to sandwich the base insulating film 11 therebetween, whereby the irradiation of optical energy melts the extension end 16a of drain electrode and metal piece 25 to be directly connected with each other. It is apparent in FIGS. 3 and 4 that the extension end 16a of drain electrode, metal piece 25 and picture element electrode 5 may be constructed in relation to being vertically reverse. Furthermore, it is required for enabling the irradiation of laser light to use a member (of glass or plastic) having at least one translucent substrate.

As seen from the above, the embodiment of the active matrix display apparatus manufactured in this embodiment can reliably correct the defect in a picture element in the state where the picture element defective portion at the display apparatus can visually be specified with ease. Therefore, an inspection process and a restoration process become easy to ensure mass productivity.

Figure 5:
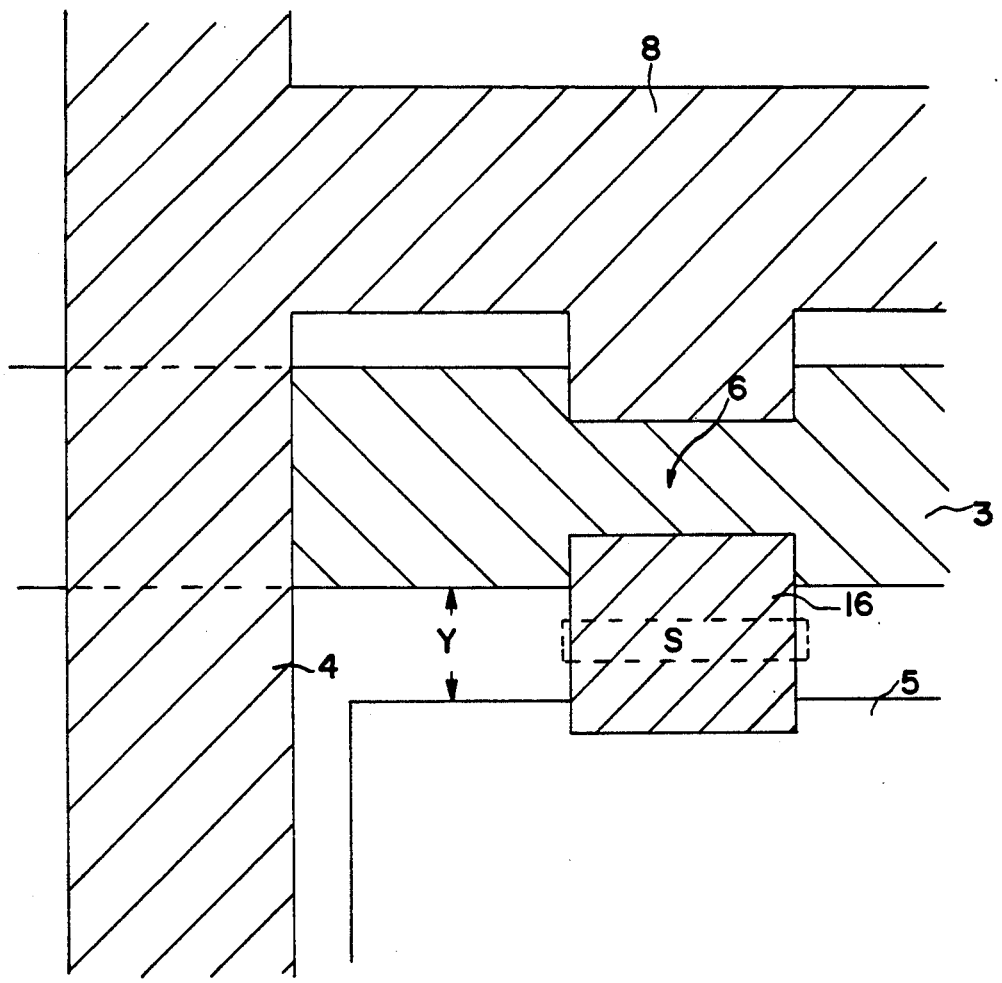
FIG. 5 is a plan view showing an enlarged portion in the vicinity of the TFT 6 shown in FIG. 1A.

In the case where the TFT 6 causes an insulation failure, it is required that, after the spare TFT 7 is connected with the picture element electrode 5, the TFT 6 must be disconnected therefrom by cutting the drain electrode 16 by irradiation the laser light. FIG. 5 is an enlarged view of the connection of TFT 6 and picture element electrode 5 in FIG. 1A, the laser light being irradiated to an area designated by S in FIG. 5, and the drain electrode 16 being cut.

When such the laser light is irradiated, when a distance Y between the picture element electrode 5 and the gate bus wiring 3 is smaller, the melted and diffused metal adheres to the picture element electrode 5 or gate bus wiring 3, and may result in the drain electrode 16 not being electrically cut, in which case the picture element defect cannot be corrected. In order to avoid such a condition, the distance Y between the picture element electrode 5 and the gate bus wiring 3 is considered to be larger. However, when the distance Y is increased, the opening ratio of the active matrix substrate may smaller to darken the entire display apparatus.

EXAMPLE 2

Figure 6:
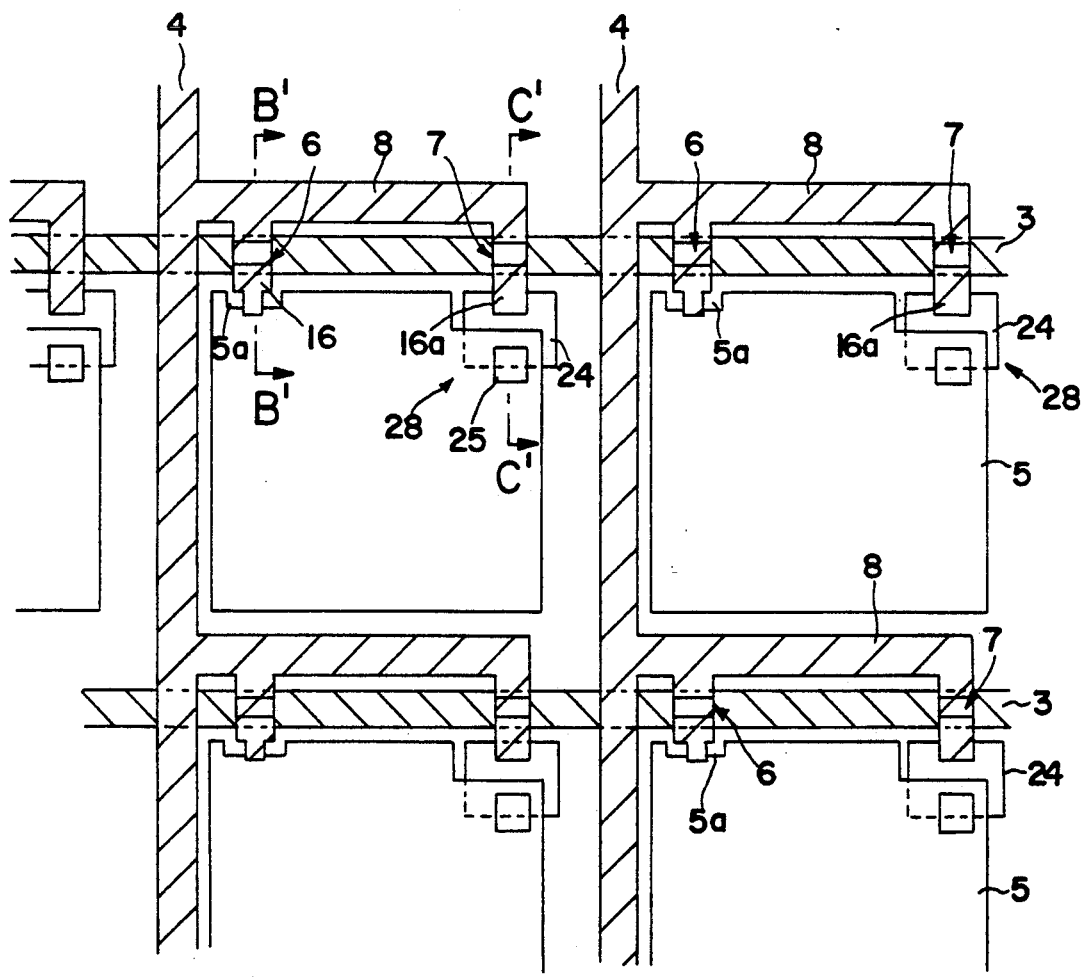
FIG. 6 is a plan view showing an active matrix substrate on which picture element electrodes having a cutout each therein are disposed, said substrate being used in a display apparatus manufactured by another method of this invention.

FIG. 6 shows an active matrix substrate used for an active matrix display apparatus manufactured by another manufacturing method of the invention. The display apparatus can reliably disconnect a picture element electrode 5 from the TFT 6 and an opening ratio does not lower. The structure of this active matrix substrate is similar to that shown in FIG. 1A, but different therefrom in the portion for connecting the drain electrode 16 at the TFT 6 and the picture element electrode 5. The structural views taken on the lines B'—B' and C'—C' in FIG. 6 are the same as those in FIGS. 1B and 1C.

Figure 7:
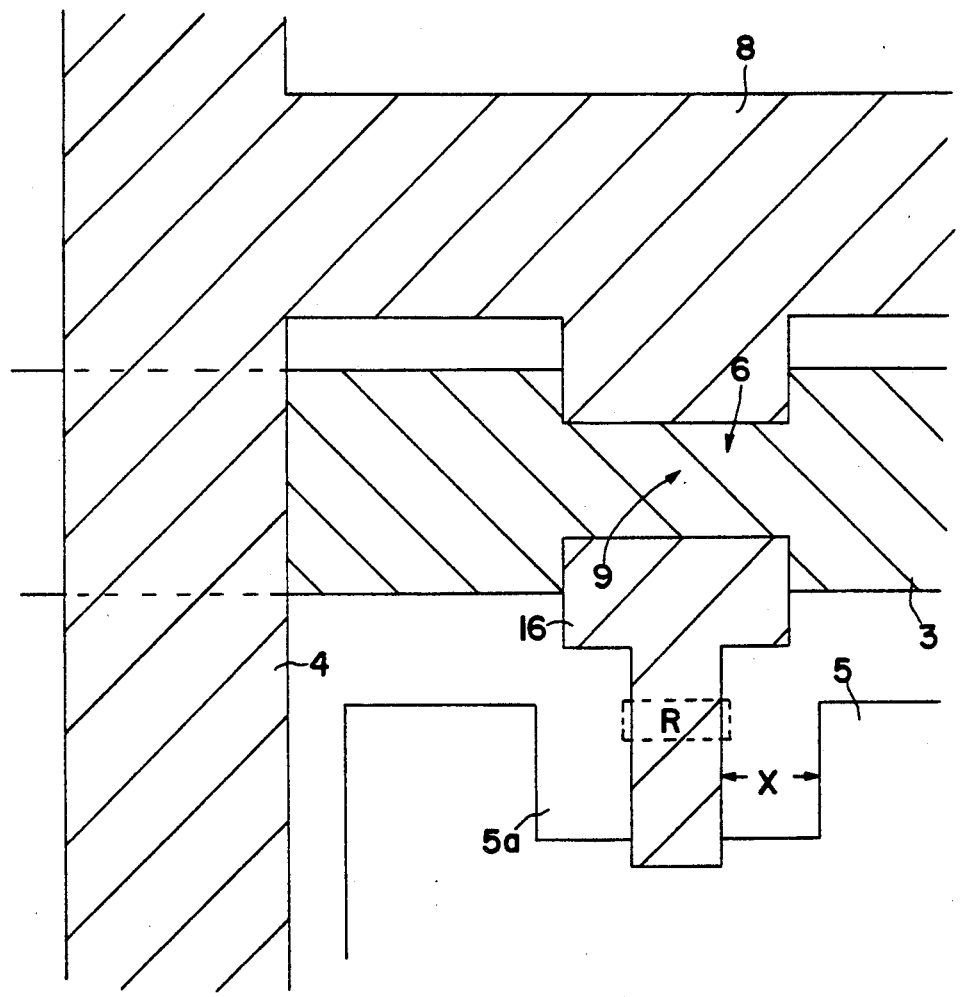
FIG. 7 is a plan view showing an enlarged portion in the vicinity of the TFT 6 shown in FIG. 6.

FIG. 7 shows an enlarged portion through which the drain electrode 16 and the picture element electrode 5 in FIG. 6 are connected, in which the drain electrode 16 is extended from above the gate electrode 9 toward the picture element electrode 5 and is smaller in width apart from the gate electrode 9. A rectangular cutout 5a is provided at a portion of the picture element electrode 5 close to the drain electrode 16. The narrow portion at the drain electrode 16 is connected at the foremost side of the cutout 5a from TFT 6 with the picture element electrode 5.

Also, in the present embodiment, when TFT 6 is deficient, the spare TFT 7 is connected to the picture element electrode in the same manner as that of Example 1. When TFT 6 must be disconnected from the picture element electrode 5 by an insulating failure of TFT 6, the laser light is irradiated to the drain electrode 16 of TFT 6 and the drain electrode 16 is cut off. Since the present embodiment of the display apparatus has the drain electrode 16 and picture element electrode 5 configuration as shown in FIG. 7, the laser light is irradiated onto the part R, shown in FIG. 7 to enable the TFT 6 to be easily cut off from the picture element electrode 5. Also, a distance X (FIG. 7) between the picture element electrode 5 and the drain electrode 16 is made 5 $\mu$m or more, whereby it is confirmed that the irradiation of laser light can completely disconnect the drain electrode 16 from the picture element electrode 5.

Thus, the active matrix display apparatus manufactured by this embodiment can reliably correct the picture element defect in the state of display apparatus where the defective portion of picture element can easily visually be specified, thereby facilitating the inspection process and restoration process so as to ensure mass productivity. Moreover, there is no fear that the opening ratio will be smaller.

EXAMPLE 3

Figure 8:
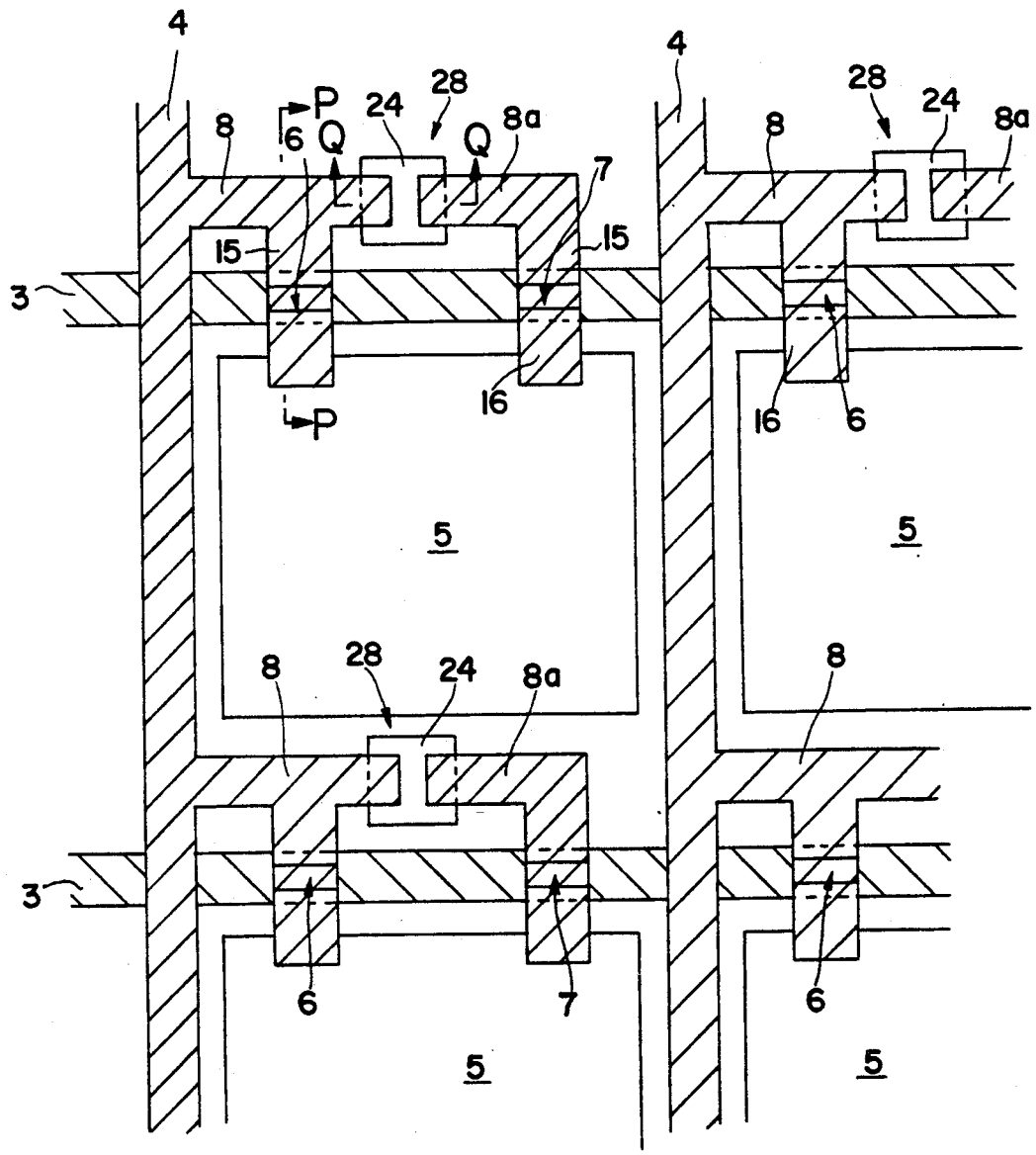
FIG. 8 is a plan view showing an active matrix substrate used in a display apparatus manufactured by another method of this invention.

FIG. 8 shows an active matrix substrate used for an active matrix display apparatus manufactured by another manufacturing method of the invention. The structure of this active matrix substrate is also similar to that shown in FIG. 1A, but different therefrom in that a drain electrode 16 at each spare TFT 7 is electrically connected with a picture element electrode 5 and a connection 28 is provided between each spare TFT 7 and each source bus wiring 4.

In the same manner as that of Example 1, a base coating film 2 is formed on a glass substrate 1. Also, in the present embodiment, the base coating film 2 need not be inevitably provided. On the base coating film 2 are disposed gate bus wirings 3 and source bus wirings 4 in a lattice-like shape. Also, in the present embodiment, the gate bus wiring 3 is composed of Ta, the source bus wiring 4 being composed of Ti. A base insulating film 11 is interposed in the intersection between the respective gate bus wirings 3 and the source bus wirings 4. At each rectangular area surrounded with the gate bus wiring 3 and source bus wiring 4 is provided a picture element electrode 5 that is composed of a transparent conductive film ITO, resulting in picture elements in a matrix. A TFT 6 is disposed in the vicinity of one corner of each picture element electrode 5 so that the drain electrode of TFT 6 and picture element electrode 5 are electrically connected to each other, a spare TFT 7 being disposed in the vicinity of another corner of the picture element electrode 5. In the present embodiment, the spare TFT 7 and picture element electrode 5 are electrically connected by means of the drain electrode 16, the TFT 6 and spare TFT 7 being juxtaposed on the gate bus wiring 3, the source electrode of TFT 6 and source bus wiring 4 being connected by means of a branch wiring 8, a source electrode 15 of spare TFT 7 being guided to a connection 28 by an extension end or signal input terminal 8a of source electrode, and the extension end 8a of source electrode at the connection 28 being disposed opposite to the branch wiring 8 in a not-conductive state. Accordingly, only the TFT 6 among the two TFTs 6 and 7 is electrically connected to the source bus wiring 4, the spare TFT 7 being not connected thereto. The sectional view of TFT 6 taken on the line P-P in FIG. 8 is the same as FIG. 1B and also that of TFT 7 is the same as TFT 6.

Figure 9:
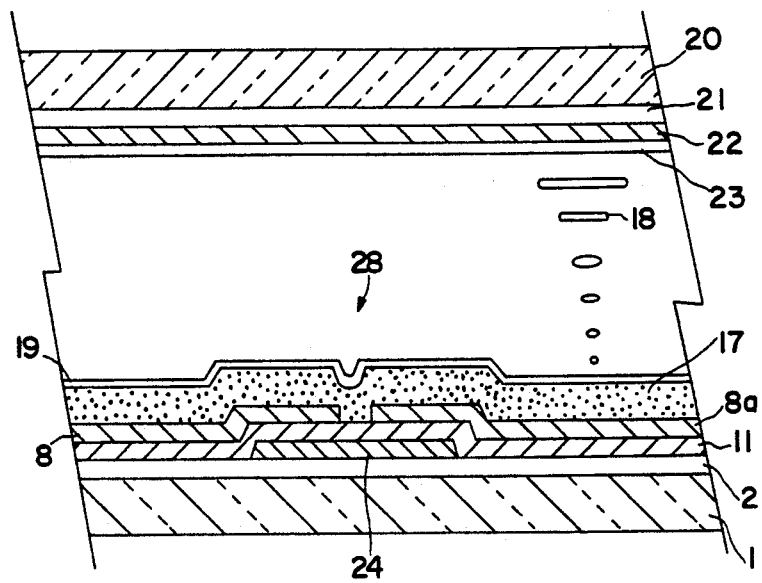
FIG. 9 is a sectional view showing the display apparatus with the active matrix substrate of FIG. 8, taken on line Q—Q of FIG. 8.

FIG. 9 is a sectional view of the connection 28 taken on the line Q—Q in FIG. 8. In FIG. 9, on a base coating film 2 is formed each joint metal layer 24, which is rectangular when viewed at the plane as shown in FIG. 8, and composed of Ta, the same as the gate bus wiring 3, so as to be patterned simultaneously with the formation of the gate bus wiring 3. On the joint metal layer 24 is deposited the aforesaid base insulating film 11, on which are disposed an extension end 8a of source electrode connected to the source electrode 15 of spare TFT 7 and a branch wiring 8 connected to the source bus wiring 4, and the extension end 8a of source electrode and branch wiring 8 are apart from each other and kept in a not-conductive state. Accordingly, each spare TFT 7 is not electrically connected with the corresponding source bus wiring 4. The extension end 8a of source electrode and the branch wiring 8 are completely covered with a protective coat 17.

The base insulating film 11 positioned between the joint metal layer 24 and the extension end 8a of source electrode and branch wiring 8 functions also as an interlayer insulating film between these metal layers and the wirings. In the present embodiment, the base insulating film 11 is set to be 2000 Å to 3500 Å in thickness.

The protective coat 17 is provided for performing the electrical connection between the branch wiring 8 and the extension 8a of source electrode in a state of being isolated from the liquid crystal layer 18 of a display medium. In the present embodiment, the protective coat 17 is set to be about 5000 Å in thickness.

Figure 10:
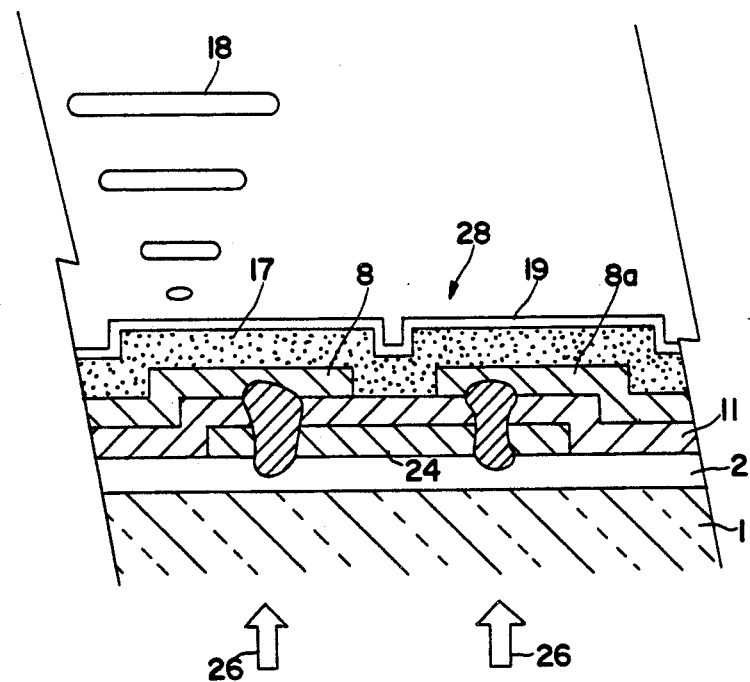
FIG. 10 is a sectional view showing a connection at which the picture element electrode and an extension end of the drain electrode are electrically connected by irradiation with laser light.

A drive voltage is applied to all the picture element electrodes 5 from all the wirings of gate bus wiring 3 and source bus wiring 4 at the liquid crystal display apparatus of the above-mentioned construction, thereby driving the entire display apparatus. In a state that the display apparatus is driven in this way, it is easy to visually detect the picture element defect caused by a malfunction of TFT 6, and the picture element defect caused thereby is easy to be corrected by the use of the connection 28. Referring to FIG. 10, the connection 28 used for correcting the picture element defect is shown in section. As shown by the arrows 26 in FIG. 10, the energy, such as laser light, infrared ray, or electron beam, is irradiated from the outside thereof to a superposed portion of the joint metal layer 24, the branch wiring 8 and the extension end 8a of source electrode. The present embodiment uses an YAG laser light. When the superposed portion of the branch wiring 8, the base insulating film 11 and the joint metal layer 24 is irradiated with the laser light, the base insulating film 11 causes insulation breakdown so that the branch wiring 8 and joint metal layer 24 are melted to be connected with each other so as to be in an electrically conductive state. In the same way, at the superposed portion of the extension end 8a of source electrode, the base insulating film 11 and the joint metal layer 24, the base insulating film 11 also causes insulation breakdown, whereby the extension end 8a and joint metal layer 24 are melted to be connected with each other so as to be in an electrically conductive state. Thus, the branch wiring 8 and the extension end 8a of source electrode are electrically connected by the joint metal layer 24, so that the spare TFT 7 is driven by the source bus wiring 4. In the present embodiment, the laser light is irradiated from the glass substrate 1 side, but it is apparent that the laser light may be irradiated from any substrate side when it transmits the same.

Even when the laser light is used to correct the picture element defect, since the protective coat 17 is formed above the connection 28, the melted metal does not mix into the liquid crystal layer 18 of the display medium, and the protective coat 17 of the transparent insulator allows the laser light to pass therethrough. Accordingly, there is no fear that the protective coat 17 will be broken by the laser light. The liquid crystal layer irradiated by the laser light initially becomes cloudy, but is soon restored to the original state, without causing any lowering of image quality.

In the case where the TFT 6 must be disconnected from the picture element electrode 5 due to the insulation breakdown of TFT 6, in the same manner as the above-mentioned, the laser light is irradiated to part of the drain electrode at TFT 6, thereby cutting the part. The TFT 6 and picture element electrode 5 are cut off from each other to thereby normally drive the picture element electrode 5 by the spare TFT 7.

Figure 11:
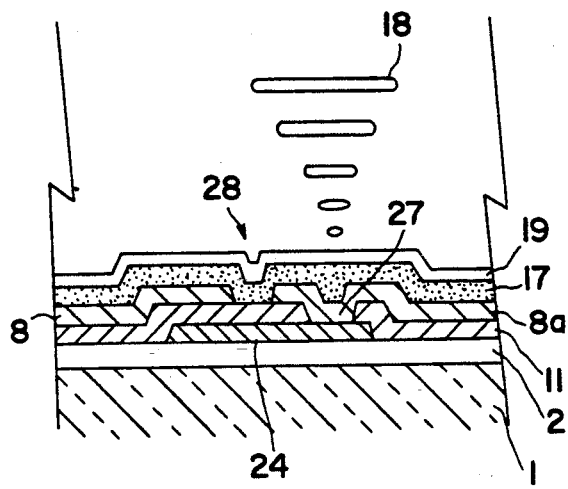
FIGS. 11 and 12, respectively, are sectional views showing other connections between the picture element electrode and the extension end of the drain electrode.
Figure 12:
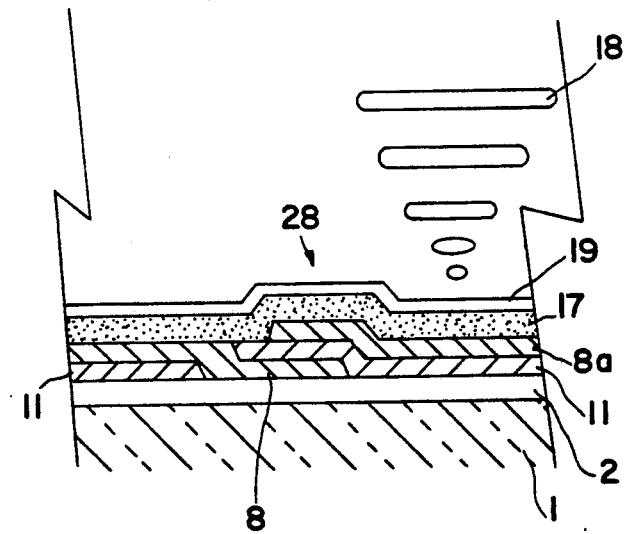

The connection 28 may be constructed as shown in FIG. 11 or 12 other than that in FIG. 9. In FIG. 11, a through hole 27 is provided at a base insulating film 11, and a joint metal layer 24 and an extension end 8a of source electrode are previously electrically connected with each other. The picture element defect due to a malfunction of TFT 6 can easily be corrected by irradiating the optical energy only to the superposed portion of the branch wiring 8 and the joint metal layer 24. In the construction shown in FIG. 12, the joint metal layer 24 is not provided, but the extension end 8a of source electrode is disposed right above the branch wiring 8 so as to sandwich a portion of the base insulating film 11 therebetween. When a malfunction is caused in TFT 6, the optical energy is irradiated to melt and directly connect the extension end 8a of source electrode and the branch wiring 8 with each other.

In FIG. 11, the through hole 27 may alternatively be provided at the branch wiring 8 side, and the branch wiring 8 and the joint metal layer 24 may previously be connected, in which the irradiation of laser light connects the extension end 8a of source electrode and the joint metal layer 24 only at the superposed portion thereof. Also, in FIG. 12, the branch wiring 8 may alternatively be formed on the extension end 8a of source electrode so as to sandwich a portion of the base insulating film 11 therebetween.

Thus, the active matrix display apparatus manufactured in this embodiment can reliably correct the picture element defect in a state where the defective portion of picture element can visually be specified with ease, thereby facilitating the inspection process and restoration process and ensuring mass productivity.

EXAMPLE 4

Figure 13:
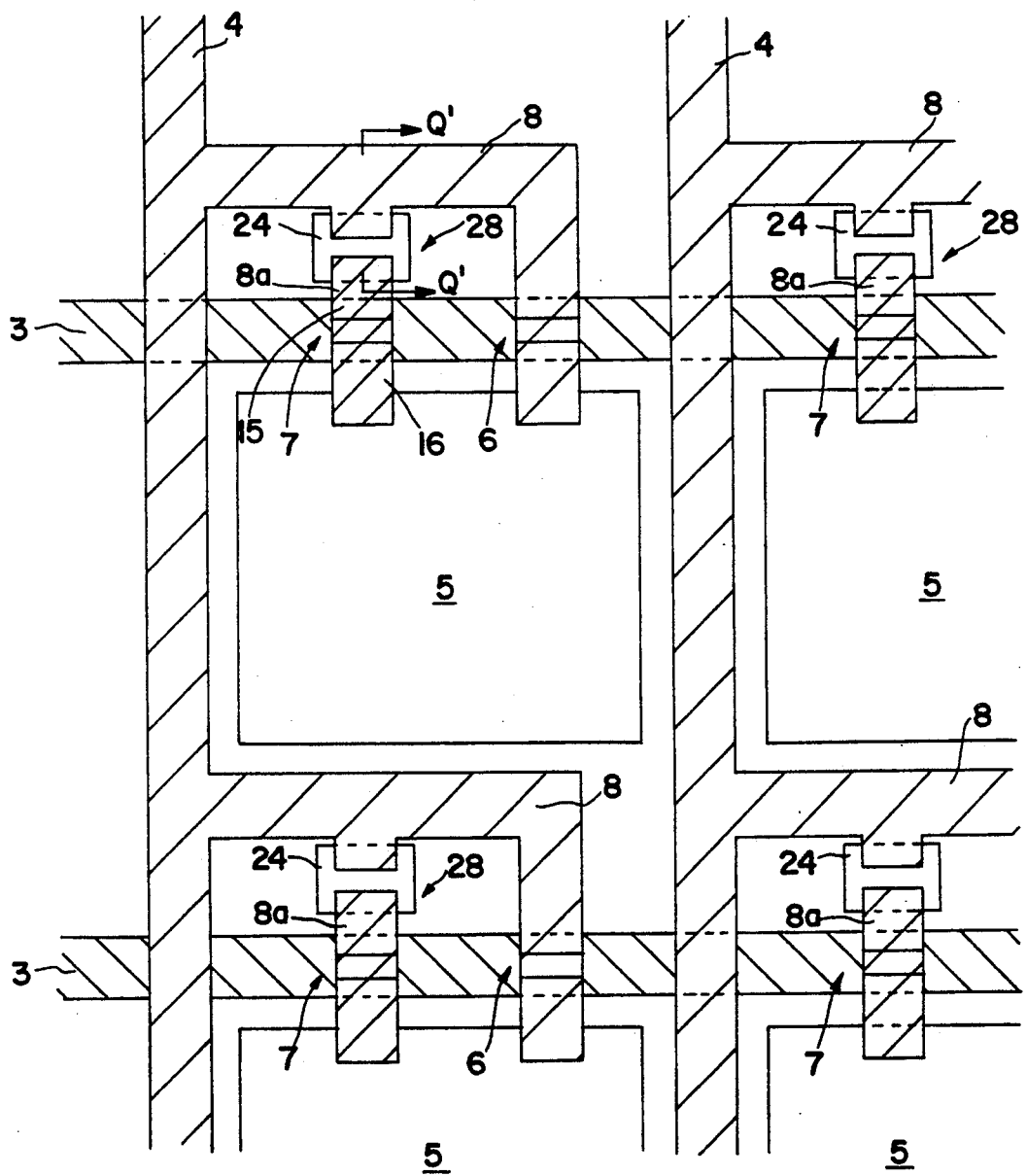
FIG. 13 is a plan view showing an active matrix substrate used in a display apparatus manufactured by another method of this invention.

FIG. 13 is a plan view of an active matrix substrate used for an active matrix display apparatus manufactured by another manufacturing method of the invention. In this active matrix substrate, a TFT 6 and a spare TFT 7 are positioned reversely to those at the substrate in FIG. 8. And each connection 28 is provided between gate bus wiring 3 and a branch wiring 8. In the same manner as the embodiment of FIG. 8, each source bus wiring 4 is formed perpendicularly to a gate bus wiring 3, and each picture element electrode 5 comprising a transparent electrode ITO is provided at a rectangular area surrounded with the gate bus wiring 3 and source bus wiring 4. The TFT 6 and the spare TFT 7 are disposed in the vicinity of two corners of each picture element electrode 5, so that the TFT 6, the spare TFT 7 and the picture element electrode 5 are electrically connected by each drain electrode, the TFT 6 and spare TFT 7 being constructed in the same manner as that of FIG. 1B. The TFT 6 and spare TFT 7 are juxtaposed on each gate bus wiring 3, the TFT 6 being connected with each source bus wiring 4 by means of the branch wiring 8. A source electrode 15 at each spare TFT 7 is guided by the extension end 8a of source electrode to a connection 28. The extension end 8a of source electrode at the connection 28 is opposite to the branch wiring 8 in a not-conductive state. Accordingly, only the TFT 6 amount the TFT 6 and spare TFT 7 is electrically connected to each source bus wiring 4, the spare TFT 7 being not connected to each source bus wiring 4. The sectional view taken on the line Q'—Q' in FIG. 13 is the same as FIG. 9.

In a case of the active matrix substrate manufactured in this embodiment, in the same manner as the substrate in FIG. 8, the laser light or the like is irradiated onto the connection 28, whereby the picture element defect caused by a malfunction of TFT 6 can be corrected.

EXAMPLE 5

Figure 14:
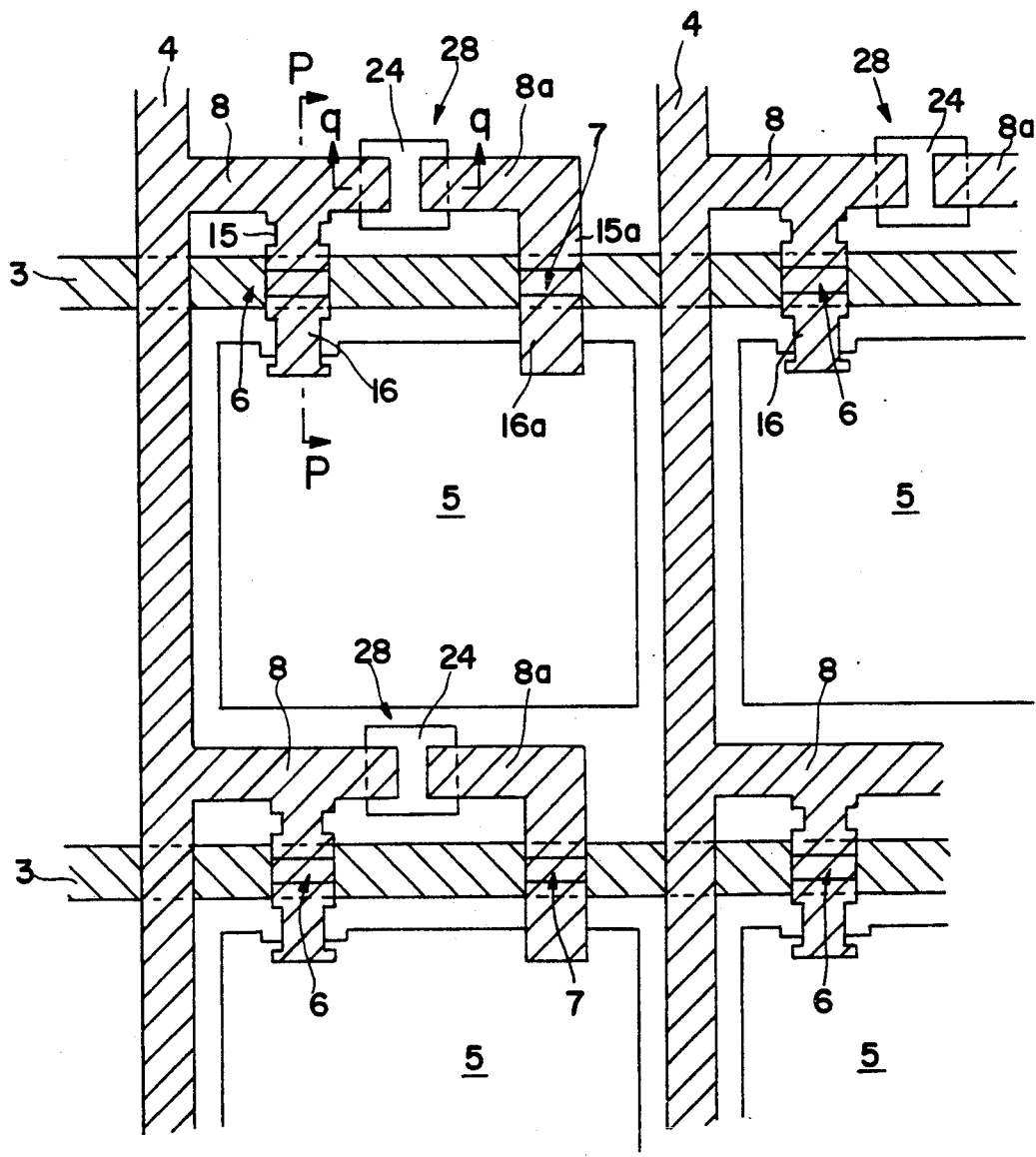
FIG. 14 is a plan view showing an active matrix substrate that constitutes a display apparatus manufactured by still another method of this invention.

FIG. 14 is a plan view exemplary of an active matrix substrate manufactured by yet another manufacturing method of the invention, in which the sectional views taken on the lines p—p and q—q are the same as those in FIGS. 1B and 9, respectively. The active matrix substrate in FIG. 14 is similar to that in FIG. 8, but a drain electrode 16 is made smaller in width at the connection of each picture element electrode 5 and each TFT 6, the picture element electrode 5 being provided with a cutout. Such a configuration of each drain electrode 16 and picture element electrode 5 makes it easy to cut the drain electrode 16 later by means of irradiation of the laser beam. Also, a source electrode 15 at each TFT 6 is partially reduced in width so as to be easy to cut by the laser beam later.

In the present embodiment, laser light is likewise irradiated onto the connection 28, whereby the picture element defect caused by the malfunction of TFT 6 can be corrected. Even though each spare TFT 7 is connected to the picture element electrode 5, when the display operation thereof is carried out while the deficient TFT 6 is being connected to the electrode 5, the picture element electrode 5 may not carry out a normal display operation. Such a malfunction is eliminated by disconnecting the TFT 6 from the picture element electrode 5 or the branch wiring 8 by means of the irradiation of laser light, the TFT 6 being disconnected from the same by irradiating the laser light to either the drain electrode 16 or the source electrode 15, or the both of them. Since the drain electrodes 16 and source electrodes 15 are provided with smaller width portions and the picture element electrodes 5 in the vicinity of the drain electrode 16 are provided with the cutouts respectively as shown in FIG. 14, there is no fear that metal melted by the irradiation of laser light is redeposited to the above members so as to result in insufficient cutting.

It depends on what malfunction occurs in TFT 6 to cut the drain electrode 16 or the source electrode 15. When only the source electrode 15 is cut, the source signal from the branch wiring 8 is not at all applied to TFT 6, but since the TFT 6 connected to the picture element electrode 5, the voltage of the picture element electrode 5 remains as a parasitic capacity between the drain electrode 16 of TFT 6 and the gate electrode 9, whereby the display operation of picture element electrode 5 may be delayed and be incomplete.

When only the drain electrode 16 is cut, a problem with the above parasitic capacity is eliminated, but when insulation breakdown is created in the TFT 6, the source signal from the branch wiring 8 will leak through the TFT 6. When both the source electrode 15 and drain electrode 16 are cut, the above-mentioned problem is completely solved, which is not preferable because the correction process is complicated and leads to a high manufacturing cost. In this embodiment, the drain electrode 16 of the deficient TFT 6 is cut and the source electrode 15 is cut as needed, whereby each picture element electrode 5 is normally driven by the spare TFT 7.

In this embodiment, laser light is irradiated from the glass substrate 1 side, but may be irradiated from any substrate side when the substrate is transparent to the laser light. Even when the laser light thus is used to correct the picture element defect, since a protective coat 17 is formed above the connection 28, there is no fear that the molten metal mixes in a liquid crystal layer of the display medium. The liquid crystal layer in the vicinity of part irradiated by the laser light becomes milky, but the milky condition soon dissipates and the apparatus restored to the original condition, thereby not causing deterioration of image quality.

When laser light is irradiated with high energy or laser light is irradiated for a long time, the protective coat 17 as well as an orientation layer 19 may be discolored or broken, but the portion irradiated by the laser light is a small area so that the display is not adversely effected. In other words, when the protective coat 17 and orientation layer 19 are broken, micro-pieces of metal or the like melted by the laser light irradiation are mixed in the liquid crystal layer, which makes the liquid crystal layer contaminative, but it is experimentally confirmed that the micro-pieces are not widely diffused from an area in the vicinity of the portion of the liquid crystal layer onto which laser light is irradiated to other areas of the liquid crystal layer. Accordingly, the liquid crystal layer is contaminated only at a specific area in the vicinity of the portion irradiated by the laser light, whereby the image quality is not substantially affected.

EXAMPLE 6

Figure 15:
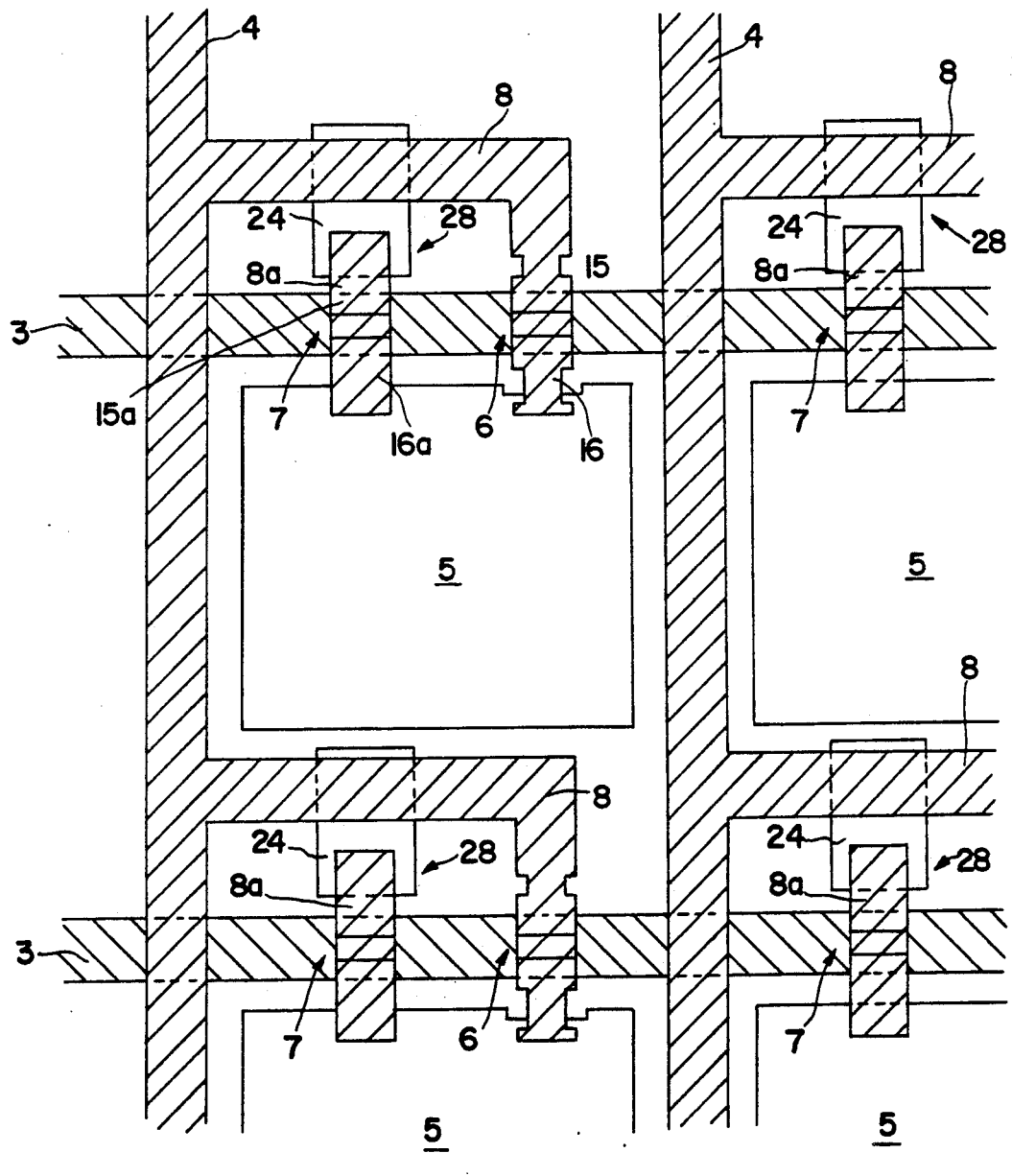
FIGS. 15 and 16, respectively, are plan views showing active matrix substrates that constitute display apparatuses manufactured by other methods of this invention.

FIG. 15 shows an active matrix substrate of an active matrix display apparatus manufactured by still another method of the invention, in which a TFT 6 and a spare TFT 7 are positioned reversely to those in FIG. 14 and a connection 28 comprises a joint metal layer 24, and a branch wiring 8 and an extension end 8a of the source electrode which are superposed on the joint metal layer 24 so as to sandwich a base insulating film 11 therebetween. The extension end 8a of source electrode being opposite in a non-conductive state to the branch wiring 8 in the connection 28. Accordingly, among the TFTs 6 and 7, the TFT 6 only is electrically connected to the source bus wiring 4, the spare TFT 7 being not connected thereto.

This embodiment, in the same way as that of the embodiment in FIG. 14, irradiates the laser light to the connection 28 so as to disconnect the TFT 6 by laser light, thereby attaining the correction of the picture element defect caused by the malfunction of TFT 6.

EXAMPLE 7

Figure 16:
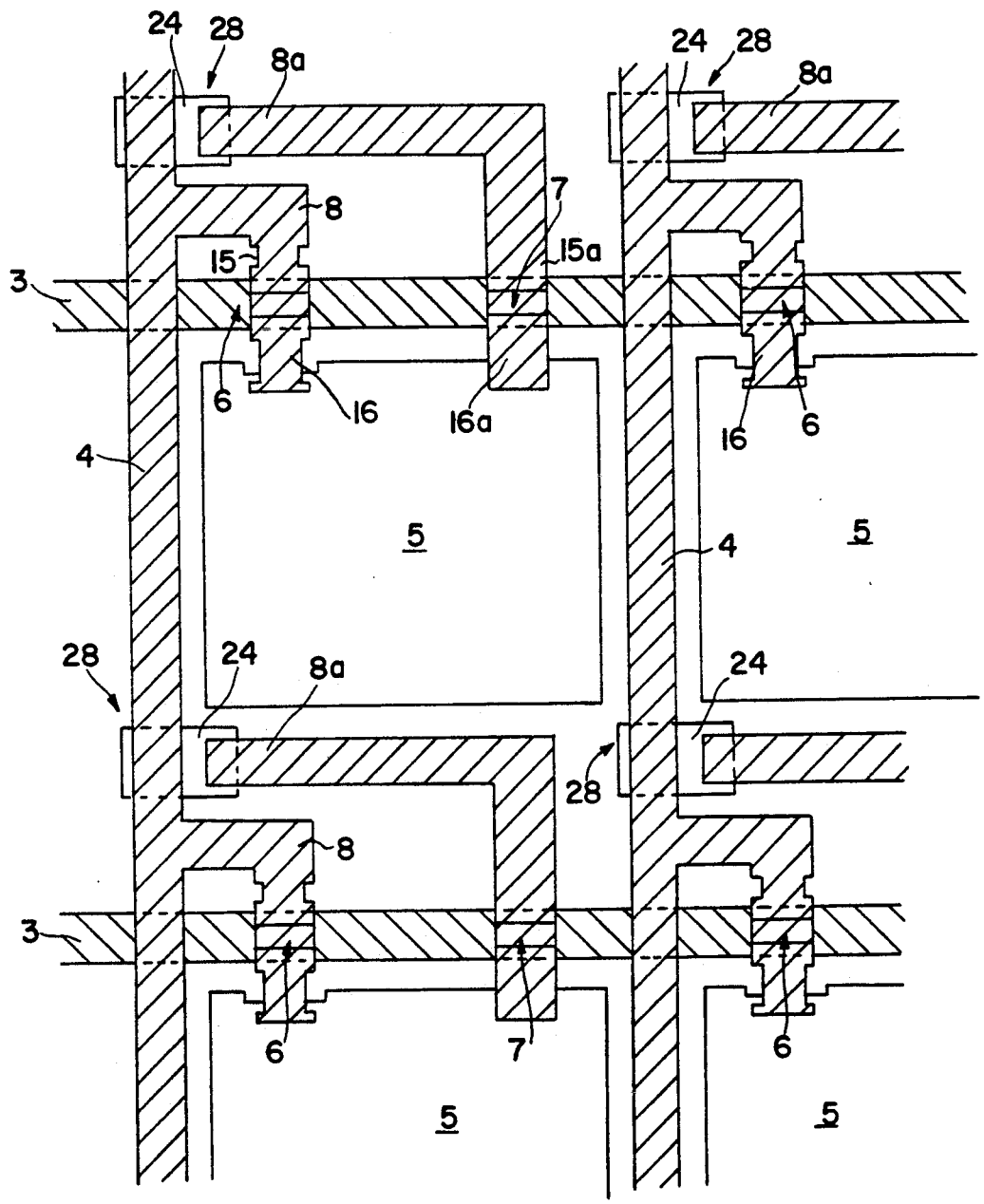

FIG. 16 shows an active matrix substrate constituting an active matrix display apparatus manufactured by still another method of the invention, in which a TFT 6 and a spare TFT 7 are positioned in the same way as those in the embodiment of FIG. 14, the TFT 6 being connected to the source bus wiring 4 by means of a branch wiring 8. A joint metal layer 24 is provided at the lower portion of the source bus wiring 4. A connection 28 comprises the joint metal layer 24, the source bus wiring 4, and an extension end 8a of source electrode. The source bus wiring 4 and the extension end 8a are superposed on the joint metal layer 24 so as to sandwich a base insulating film 11 therebetween, the extension end 8a of source electrode being opposite in a not-conductive state to the source bus wiring 4 in the connection 28. Accordingly, among the TFT 6 and spare TFT 7, the TFT 6 only is electrically connected to the source bus wiring 4, the spare TFT 7 being not connected thereto.

The present embodiment, in the same way as that of the embodiment of FIG. 14, irradiates the laser light to the connection 28 so as to disconnect the TFT 6 from the source bus wiring 4 by the laser light, thereby attaining the correction of the picture element defect caused by the malfunction of TFT 6.

Also, in the aforesaid Examples 4 through 7, the connection 28 can be constructed as shown in FIG. 11 or 12 other than FIG. 9.

In all the aforesaid examples, the TFT and spare TFT are juxtaposed on the gate bus wiring and connected to the same side of each picture element electrode, which can be alternatively connected to a different side of the picture element electrode. Also, in all the aforesaid examples, the manufacturing method for the transparent type liquid crystal display apparatus is shown, but the present invention is, of course, applicable to a reflection type display apparatus. Also, in the Examples 1 through 4, the active matrix type liquid crystal display apparatus using the TFT is described, but the present invention is applicable to a wide-range display apparatus using various function elements, such as a metal-insulator-metal (MIM) element, a diode, and a varistor, and further to various display apparatus using thin film light mission layers, distributed electro-luminance layers, and a plasma luminosity.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method for manufacturing an active matrix display apparatus having a pair of substrate, at least one of which is translucent and a display medium charged between said substrate, the optical characteristics of said display medium being modulated in response to applied voltage, in which said method comprises the steps of:
    forming picture element electrodes disposed in a matrix at the inner surface of either one of said pair of substrate, switching elements electrically connected to said picture element electrode respectively so as to apply voltage to each picture element electrodes respectively so as to apply voltage to each picture element electrode, signal lines connected to said switching element electrodes so as to apply a drive signal to said switching elements, spare switching elements connected to said signal lines close to said picture element electrodes but without contact therewith, and connections, each including an extension end of each of said spare switching elements and a metal piece electrically connected to one end of each of said picture element electrodes and said extension end and metal piece being disposed opposite to each other in a non-conductive state;
    forming opposite electrodes on the other of said pair of substrate;
    charging said display medium between said pair of substrate;
    applying a drive signal to said display medium via said picture element electrodes and opposite electrodes, thereby detecting a defect in said switching element, and
    irradiating energy onto said connection between said picture element electrode connected to said switching element, the defect of which has been detected as a disconnected defect, and said spare switching element, thereby electrically connecting said picture element electrode with said spare switching element.

2. A method for manufacturing an active matrix display apparatus having a pair of substrates, at least one of which is translucent and a display medium charged between said substrates, the optical characteristics of said display medium being modulated in response to applied voltage, in which said method comprises the steps of:
    forming picture element electrodes disposed in a matrix at the inner surface of either one of said pair of substrates and having cutouts respectively, switching element electrodes electrically connected to said picture element electrodes in the vicinity of said cutouts respectively so as to apply voltage to each picture element electrode, signal lines connected to said switching element electrodes, spare switching elements connected to said signal lines close to said picture element electrodes but without contact therewith, and connections, each including an extension end of each of said spare switching elements and a metal piece electrically connected to one end of each of said picture element electrodes, said extension end and metal piece being disposed opposite to each other so as to sandwich at least an insulating film therebetween;
    forming opposite electrodes on the other said pair of substrates;
    charging said display medium between said pair of substrates;
    applying a drive signal to said display medium via said picture element electrodes and opposite electrodes to thereby detect a defect in said switching element;
    irradiating energy onto said connection between said picture element electrode connected to said switching element, the defect of which has been detected, and said spare switching element, thereby electrically connecting said picture element electrode with said spare switching element; and
    irradiating energy to electrically disconnect between said switching element, the defect of which has been detected, and said picture element electrode connected thereto at said cutout thereof.

3. A method for manufacturing an active matrix display apparatus according to claim 1 wherein at each of said connections, an insulating film is disposed between said picture element electrode and said spare switching element, and a joint metal layer is disposed below said insulating film on which the extension end of said switching element and said metal piece are disposed to face each other.

4. A method for manufacturing an active matrix display apparatus according to claim 1, wherein, at each of said connections, the extension end of said switching element and metal piece are disposed so as to sandwich an insulating film therebetween.

5. A method for manufacturing an active matrix display apparatus according to claim 2, wherein, at each of said connections, the extension end of said switching element and metal piece are disposed so as to sandwich an insulating film therebetween.

6. A method for manufacturing an active matrix display apparatus having a pair of substrate, at least one of which is translucent and a display medium charged between said substrate, the optical characteristics of said display medium being modulated in response to applied voltage, in which said method comprises the steps of:
    forming picture element electrodes disposed in a matrix at the inner surface of either one of said pair of substrate, switching elements electrically connected to said picture element electrodes respectively so as to apply voltage to each picture element, spare switching elements electrically connected to said picture element electrodes respectively said spare switching elements having extension ends of signal input terminals disposed adjacent to ends of said signal lines without contact therewith, signal lines connected to said switching elements respectively, said signal liens having branch wirings branched therefrom connected to each of said switching elements so as to apply a drive signal to said switching elements through said branch wirings, and connections each opposite to said extension ends of a signal input terminal at each of said spare switching elements, said each extension end and each branch wiring being opposite to each other in a non-conductive state;

forming opposite electrodes on the other of said pair of substrate;

charging said display medium between said pair of substrate;

applying drive voltage to said display medium through said respective picture element electrodes and opposite electrodes, thereby detecting a picture element defect; and irradiating energy onto said connection at which the extension end of said signal input terminal of said spare switching element connected to said picture element electrode having a defect which has been detected as a disconnected defect and said branch wiring being opposite to each other, thereby electrically connecting said spare switching element with said signal line by means of said connection.

7. A method for manufacturing an active matrix display apparatus according to claim 6, which further includes a step of electrically disconnecting by means of an energy irradiation either one of portions between said switching element and said signal line and between said switching element and said picture element electrode.

8. A method for manufacturing an active matrix display apparatus according to claim 7 wherein at each of said connections, an insulating film is disposed between said picture element electrode and said spare switching element, and a joint metal layer is disposed below said insulating film on which the extension end of said signal input terminal and said branch wiring are disposed to face each other.

9. A method for manufacturing an active matrix display apparatus according to claim 7, wherein, at each of said connections, the extension end of said signal input terminal of said spare switching element, and said branch wiring are disposed to sandwich an insulating film therebetween.

10. A method for manufacturing an active matrix display apparatus according to claim 6 wherein at each of said connections, an insulating film is disposed between said picture element electrode and said spare switching element, and a joint metal layer is disposed below said insulating film on which the extension end of said signal input terminal and said branch wiring are disposed to face each other.

11. A method for manufacturing an active matrix apparatus according to claim 10, wherein a through hole is formed in said insulating film positioned between either said extension end of said signal input terminal or said branch wiring and said joint metal layer.

12. A method for manufacturing an active matrix display apparatus according to claim 6, wherein, at each of said connections, the extension end of said signal input terminal of said spare switching element, and said branch wiring are disposed to sandwich an insulating film therebetween.

13. A method for manufacturing an active matrix display apparatus having a pair of substrate, at least one of which is translucent and a display medium charged between said substrate, the optical characteristics of said display medium being modulated in response to applied voltage, in which said method comprises the steps of:

forming picture element electrodes disposed in a matrix on the inner surface of either one of said pair of substrate, switching elements electrically connected to said picture element electrodes respectively so as to apply voltage to each picture element, spare switching elements electrically connected to said picture element electrodes respectively, said spare switching element having signal input terminals disposed adjacent to signal lines without contact therewith, signal lines connected to said switching elements respectively so as to apply a drive signal to each switching element, and connections each being opposite to the extension end of said signal input terminal at each of said spare switching elements and each of said signal lines respectively, in a non-conductive state respectively;

forming opposite electrodes on the other of said pair of substrate;

charging said display medium between said pair of substrate;

applying drive voltage to said display medium through said picture element electrodes and opposite electrodes, thereby detecting a picture element defect;

irradiating energy to said connection where an extension end of said signal input terminal at said spare switching element connected to said picture element electrode which has been detected defective, and said signal line are opposite to each other, thereby electrically connecting said spare switching element with said signal line by means of said connection; and cutting off by an energy irradiation either one of portions between said switching element and said signal line or between said switching element and said picture element electrode.

14. A method for manufacturing an active matrix display apparatus according to claim 13 wherein at each of said connections, an insulating film is disposed between said picture element electrode and said spare switching element, and a joint metal layer is disposed below said insulating film on which the extension end of said signal input terminal and said signal line are disposed to face each other.

15. A method for manufacturing an active matrix display apparatus according to claim 14, wherein a through hole is formed at said insulating film between said extension end of said signal input terminal or said signal line and said joint metal layer.

16. A method for manufacturing an active matrix display apparatus according to claim 13, wherein, at each of said connections, said extension end of said signal input terminal and said signal line are disposed so as to sandwich an insulating film therebetween.

17. A method for manufacturing an active matrix display apparatus according to claim 2, wherein at each of said connections, a joint metal layer is disposed below said insulating film on which the extension end of said switching element and said metal piece are disposed to face each other.

* * * * *